July 24, 1923.

N. V. DE LIPSKI 1,462,537

CHANGEABLE SCENIC EFFECT

Filed April 12, 1922

Nicolas V. de Lipski
INVENTOR.

By Horace E. Beall
ATTORNEY.

July 24, 1923.

N. V. DE LIPSKI 1,462,537

CHANGEABLE SCENIC EFFECT

Filed April 12, 1922

Nicolas V. de Lipski.
INVENTOR.

BY
ATTORNEY.

July 24, 1923.
N. V. DE LIPSKI
1,462,537
CHANGEABLE SCENIC EFFECT
Filed April 12, 1922
3 Sheets-Sheet 3
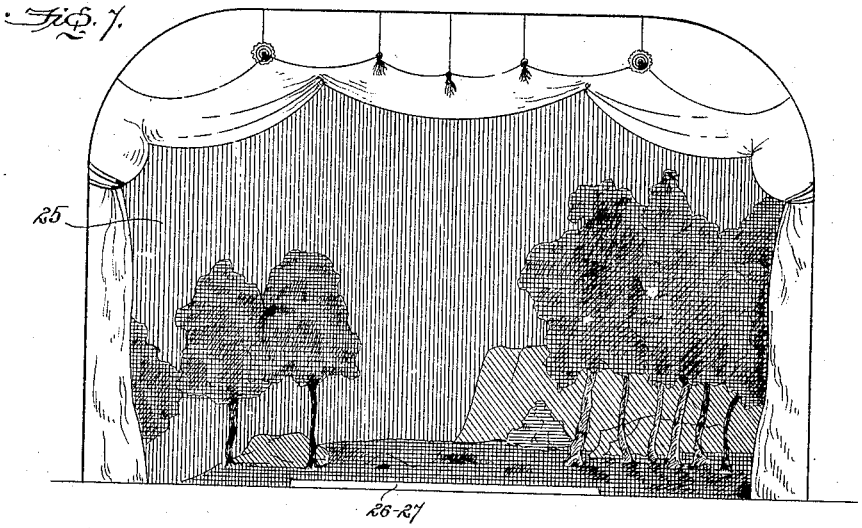
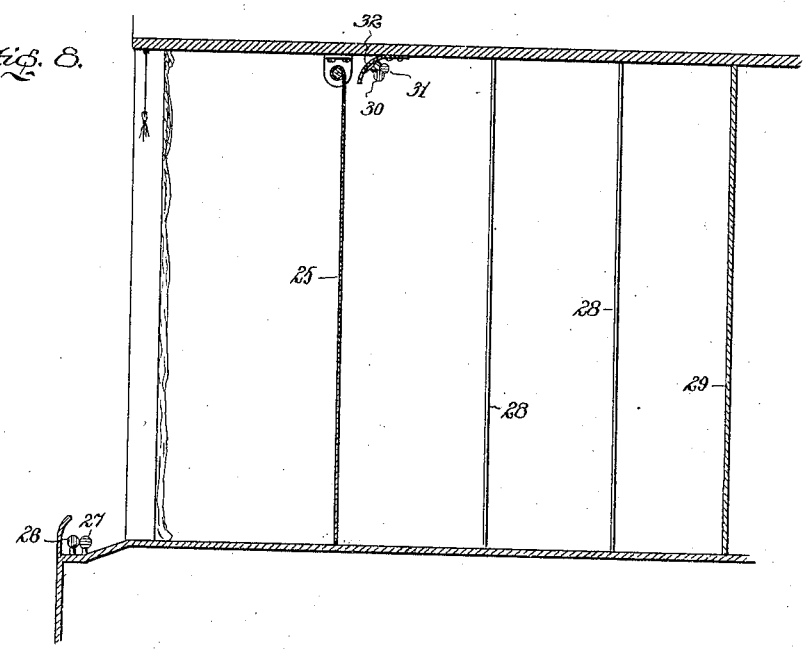
Nicolas V. de Lipski.
INVENTOR
By Horace B Beall
ATTORNEY.

Patented July 24, 1923.

1,462,537

UNITED STATES PATENT OFFICE.

NICOLAS V. DE LIPSKI, OF NEW YORK, N. Y., ASSIGNOR OF ONE-HALF TO ELAINE HALE PHILLIPS, OF NEW YORK, N. Y.

CHANGEABLE SCENIC EFFECT.

Application filed April 12, 1922. Serial No. 551,950.

*To all whom it may concern:*

Be it known that I, NICOLAS V. DE LIPSKI, a citizen of Russia, residing at New York city, New York, have invented certain Improvements in Changeable Scenic Effects, of which the following is a full and complete specification.

My invention relates to color scenes or designs of that particular character in which the subjective or visual appearance of the picture is changed through the medium of different colored lights successively projected thereon, whereby different scenic effects may be produced for especial use in connection with theatrical performances.

In the present instance I obtain a change in the scene, picture, or design, through the peculiar manner of painting the subject of the transformation, whereby there is represented—as seen by white light—a plurality of separate and distinct scenes, figures, or designs in different colors and in which certain colored objects or parts of one scene, picture or design are superimposed on colored objects or parts of another scene, picture or design; selecting for the purpose combinations of colors that will properly blend or become neutralized to clearly present to the eye either scene or colored picture according to the color of the light projected on to the original painting in illuminating the same.

The primary object of my invention is to provide a changeable scene of this character for particular use in connection with theater appliances so as to obviate the necessity and consequent interruption of shifting the scenes as usually practiced, although as will be hereinafter explained the arrangement or peculiar scheme of painting the original or basic subject may be employed for producing changeable advertising signs that will be effective in attracting attention to the sign.

A further object of my present invention is to provide an arrangement for producing theatrical scenery whereby a plurality of different scenes may be presented to the eyes of the spectators in a quick and effective manner by simply changing the colors of the illumination and source from which the colored lights are thrown or projected, special means being employed in this instance in connection with the scheme of painting to produce the desired effect.

With these principal objects in view my invention is hereinafter fully explained, and what I claim as new and desire to protect by Letters Patent is more specifically set forth in the appended claims.

In the accompanying drawings illustrating the adaptability of my invention:

Figs. 7 and 8 illustrate a modification or special application of my invention in connection with theatrical scenery.

As will hereinafter appear the general scheme of my invention may be applied to various uses or situations wherein a changeable scene, picture or design is required, as for instance in connection with different theater appliances as scenes, images, articles and other paraphernalia, in connection with pictures illustrating different scenes on a single sheet or ground, and in connection with signs to be employed in advertising; therefore any specific designation in the specifications and claims should be understood to apply to other subjects to which the invention may be obviously applied.

Figure 1:
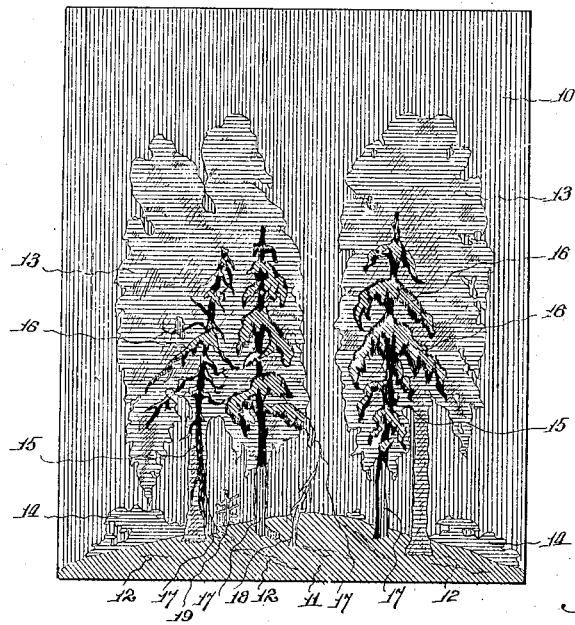
Fig. 1 is a view showing a scene designed for theatrical purposes as it appears in white light, the view being lined to indicate the different colors that may be employed in producing the different effects under change in color of illumination.

In carrying out my invention to produce two different scenes visible to the eye when the painting is successively illuminated by different colored lights, as for instance such a painting or combination scene as illustrated in Fig. 1 of the drawings, the characteristics of the two scenes are first sketched or outlined, then one of said scenes is painted with colors that will correspond substantially with the subject of that particular scene and give the desired effect when illuminated by red light, after which the other scene is painted with colors and hues superimposed that will combine with the colors and hues of the scene first painted to not only present to the eye an entirely different scene when illuminated by blue light but also become neutralized by the red light, the effect in each instance being produced by superimposed colors and hues or combination thereof which may overlap one another; that is to say a part of an object in the scene last painted—to appear under blue light—may be composed of one color or hue and another part thereof of another color or hue and each superimposed on colors or hues in the first picture with which they will become neutralized.

Figure 2:
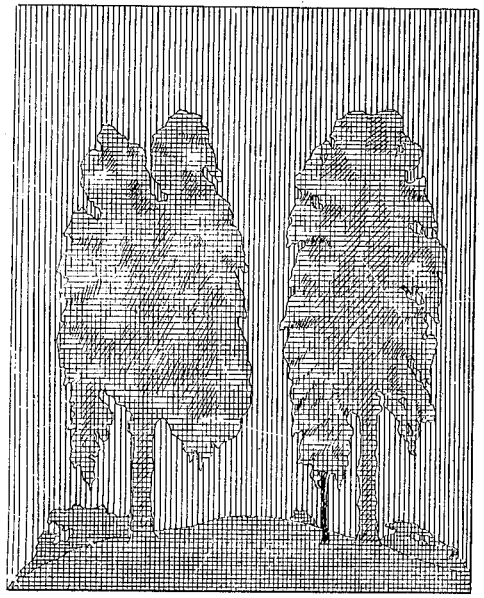
Fig. 2 is a view of the same scene as it will appear to the eye when subjected to illumination by red light.
Figure 3:
Fig. 3 is a view of the same combination scene as it will appear by blue light illumination.

In the example of an original or basic scene, such as shown in Fig. 1 of the drawings, it will be noted that the color used in painting the background or sky 10 is light red or pink, the color of the foreground 11 is light green with parts thereof, as 12, a slightly darker shade of green to represent shadows. The larger trees and bushes, 13 and 14, are painted blue with darker splotches to give lights and shadows enhanced by certain parts of the scene later painted and hereinafter referred to, while the smaller trees 15 are outlined in dark brown with the foliage 16 in light green and certain parts of said trees, as 17, which are superimposed on the pink background and green foreground, painted a red color to become neutralized under red illumination. For the same purpose the saplings 18 and 19 are painted red. When the picture or combination scene is painted in colors such as hereinbefore designated and illuminated by red light the background or sky will appear red of a hue giving the impression of a sunset scene, the two larger trees, bushes and foreground will appear dark neutralizing the superimposed portions of the smaller trees while those portions of the smaller trees which overlap the background or sky and foreground and are painted red are also neutralized, thus presenting to the eye a typical summer scene at sunset, as illustrated in Fig. 2. On the other hand when the basic picture shown in Fig. 1 is illuminated by blue light projected thereon the scene is immediately changed to a winter moonlight scene, the larger trees 13 disappearing, the background or sky changing to purple, the smaller trees clearly outlined, and the foliage 16 and foreground 11 changing to substantially white to give the impression of snow, all as illustrated in Fig. 3. This is a simple illustration of the effect produced by painting a picture with superimposed colors combined in such a manner as to become neutralized one with respect to the other in the different scenes under the influence of the different colored lights; and although I have in this example of the application of the general color scheme employed certain colors it will be understood of course that other primary colors will produce similar effects, and in like manner colors may be employed to produce changeable scenes when illuminated by colored lights other than those mentioned, as for instance a green light. It will be apparent, also, that a wider range in scenery effect may be had by a more elaborate basic scene or picture, and to provide stage settings for theatrical performances the back-drop, side-drops or flies may be likewise suitably painted in carrying out the general scenery effect; and of course the settings at one side of the stage may be painted in colors or hues to be brought out in one color-light and the settings at the other side in colors or hues which will be brought out in another color-light, in which instance the two colored lights would be projected separately on the different settings, the latter being painted to harmonize when illuminated in this manner; for instance an interior scene may be represented in which one side of the room is supposed to be artificially lighted while the other is in the moonlight coming through windows. Obviously, therefore, the color scheme when employed for this purpose is susceptible of providing a variety of stage effects, in which the change from one scene to another is quickly accomplished, and to produce a greater variety of changes in scenery in a single setting I have devised a special arrangement of scenery, hereinafter described.

Figure 4:
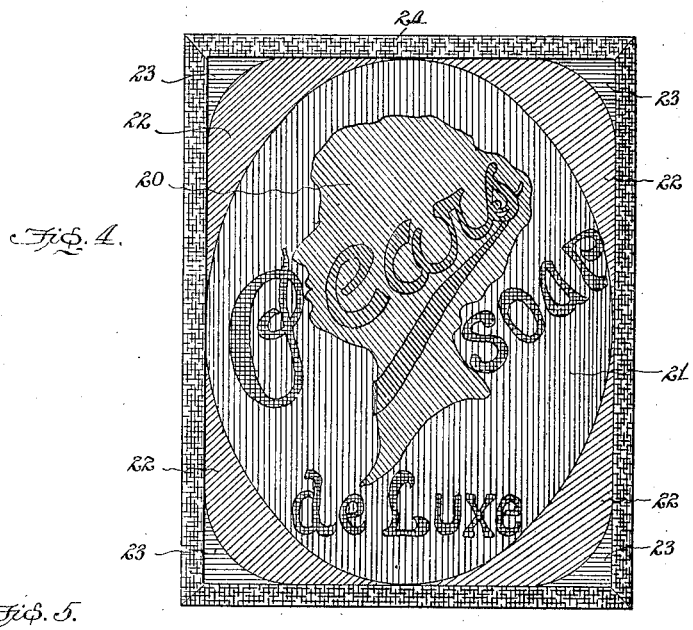
Fig. 4 is a view of an advertising sign as it appears under a white light, being also lined to indicate the colors employed.
Figure 5:
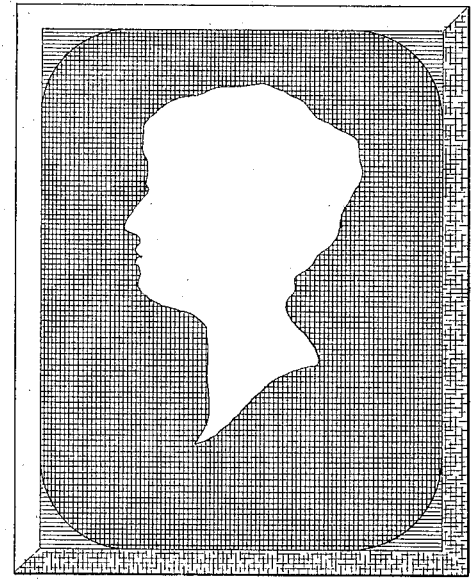
Fig. 5 is a view of the advertising sign as it appears when illuminated by blue light.
Figure 6:
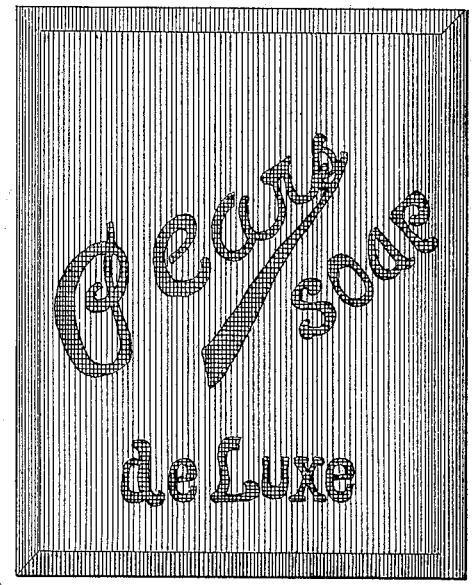
Fig. 6 is a view of the same advertising sign as it appears illuminated by red light.

By reference to Figs. 4 to 6, inclusive, it will be seen how the color scheme may be applied in producing an effective advertising medium or sign to change the subject-matter alternately thereby causing pleasant sensations to the observers as well as calling attention to the advertisement. In the form of advertisement illustrated I propose to have the silhouette 20, constituting one of the principal objects of the sign in the present instance, painted a pale green, and the other principal object or subject-matter comprising the word's "Pear's soap de luxe" painted in colors or hues which will properly combine with the silhouette and background 21 to appear and disappear according to the color of the light projected on to the sign, as shown the background being painted red, the letter "P" and words "soap de luxe" being dark brown to neutralize with the background under blue light, and the letters "ear's" and mark painted a shade of green that will likewise neutralize with the silhouette in blue light. The part 22 of the mat is purple with the corners 23 of said mat painted a light blue; while the frame may be painted different shades of yellow, as indicated in said drawings. When this sign is illuminated by blue light the silhouette will stand out boldly and appear white in contrast with the background and the words "Pear's soap de luxe" will be absorbed in the picture or invisible to the eye while the portions 22 of the mat will blend with the background 21 showing the corners 23 a paler blue and the frame 24 in substantially white and pale yellow, all as illustrated in Fig. 5. Conversely, when the sign is illuminated by red light the words "Pears soap de luxe" will stand out boldly in dark brown or black and all the other painted portions of the sign will appear red, the frame only being distinguishable in different shades, giving the effect shown in Fig. 6. In this instance the painting will in a white light have the appearance shown in Fig. 4, in blue-light the appearance shown in Fig. 5, and in red light the appearance shown in Fig. 6, so that there are practically three changes, and of course the lights are to be projected on to the sign in succession. As stated in reference to the changeable scenes shown in Figs. 1 to 3 hereinbefore described the advertising sign may be also painted in different combinations of colors and hues and elaborated as to subject-matter. The advantages of an advertising sign of this character will of course be obvious.

In adapting the color scheme for the purpose of giving a greater variety of changes of scenery for theatrical purposes I have devised the arrangement shown in Figs. 7 and 8 in which there is provided a transparent screen 25 located near the front of the stage and on which is painted combinations of colors and hues superimposed as described with reference to Figs. 1, 2 and 3, so that the red and blue lights 26 and 27 in the foot-lights may be projected thereon from in front to give two changes of scenery, and in the rear of this transparent painted screen or curtain there are stage settings, as the flies 28 and back-drop 29 similarly painted with scenes that will be changed when the red and blue lights 30 and 31 in the rear of the transparent screen are successively lighted; it being understood of course that when either the red light 30 or blue light 31 is projected the lights 26 and 27, or footlights, are extinguished so that the scenes on the stage settings 28 and 29 will be seen through said transparent screen, at which time the said screen may be rolled up. The colored lights 30 and 31 may be provided with a reflector 32 to direct the light on to the stage settings in the rear of the transparent screen or curtain 25. By providing this special arrangement at least four changes of scenery may be made without interruption between the changes, for it is accomplished merely by changing the color of light projected successively on the transparent screen and on the stage settings in the rear of the same.

From the foregoing description it will be clearly seen that the scheme of painting for scenery, pictures, signs, &c., may be used in a variety of situations, and in carrying out the scheme it is only necessary to use combinations of colors and hues that will give the required color sensations for the scenes depicted and illuminated by red and blue light respectively, the colors and hues being superimposed wherever necessary so that some will be neutralized by others under red light and other colors and hues that will neutralize under blue light; and therefore I do not confine myself to those primary colors herein designated as others may be used to produce similar effects.

I claim:—

1. Scenery for stage settings comprising one scene painted in colors and superimposed shades of color to produce the visual effect of said scene in colors and hues when subjected to a colored light and a second scene painted in colors and superimposed shades of color combining with and overlapping the colors and shades of color of the other scene to harmonize and neutralize therewith in producing the visual effect of said second scene in colors and hues when the scenery is subjected to light of another color from that producing the first mentioned scene, the colors for the two scenes being so applied that each scene is distinctly visible to the eye independently of the other under the influence of the colored lights, respectively.

2. Scenery for stage settings comprising a transparent screen with a plurality of scenes painted thereon in sets of colors superimposed and combining to produce the visual effect of the separate scenes successively when subjected to different colored lights successively; together with stage settings in the rear of the transparent screen and likewise painted with sets of colors superimposed and combining to produce the visual effects of the separate scenes successively when subjected to different colored light successively.

3. Scenery for stage settings comprising a transparent screen with a plurality of scenes painted thereon in sets of colors superimposed and combining to produce the visual effects of the separate scenes successively when subjected to different colored lights successively, colored lights in front of said screen to produce the aforementioned effects, stage settings in the rear of the screen likewise having a plurality of scenes painted thereon in sets of colors superimposed, and colored lights also in rear of the transparent screen for projection upon the last mentioned stage settings, as herein shown and described.

4. Scenery for stage settings comprising back-drop and flies on which one scene is first painted in colors and shades of colors according to the illumination used in producing the visual effect of said scene in colors and tones and upon which stage settings a second distinctive scene is painted in colors and superimposed shades of colors according to the illumination of another color to bring out this latter scene in colors and tones, the colors and superimposed shades of colors for the two scenes being combined to harmonize and neutralize whereby each scene is distinctly visible to the eye independently of the other under the influence of the colored lights, respectively; together with a transparent drop curtain in front of the aforementioned stage settings and upon which two composite scenes are painted in colors and superimposed shades of color in like manner to the painting of the stage settings, foot-lights of different colors in front of the drop-curtain, colored lights in the rear of said drop curtain and shielded from the latter to throw the light on the stage-settings, and means for controlling the illumination from the colored lights respectively.

NICOLAS V. DE LIPSKI.